(12) United States Patent
Jeannot et al.

(10) Patent No.: US 12,403,530 B2
(45) Date of Patent: Sep. 2, 2025

(54) ADDITIVE MANUFACTURING MACHINE WITH POWDER DISPENSING BY SIEVING

(71) Applicant: AddUp, Cebazat (FR)

(72) Inventors: Alexandre Jeannot, Cebazat (FR); Albin Effernelli, Cebazat (FR); Cedric Carlavan, Cebazat (FR)

(73) Assignee: ADDUP, Cebazat (FR)

( * ) Notice: Subject to any disclaimer, the term of this patent is extended or adjusted under 35 U.S.C. 154(b) by 851 days.

(21) Appl. No.: 17/614,151

(22) PCT Filed: May 19, 2020

(86) PCT No.: PCT/EP2020/064000
§ 371 (c)(1),
(2) Date: Nov. 24, 2021

(87) PCT Pub. No.: WO2020/239553
PCT Pub. Date: Dec. 3, 2020

(65) Prior Publication Data
US 2022/0212266 A1 Jul. 7, 2022

(30) Foreign Application Priority Data
May 24, 2019 (FR) ..................... 1905467

(51) Int. Cl.
*B22F 10/34* (2021.01)
*B22F 10/28* (2021.01)
(Continued)

(52) U.S. Cl.
CPC .............. *B22F 10/34* (2021.01); *B22F 10/28* (2021.01); *B22F 12/50* (2021.01); *B22F 12/52* (2021.01);
(Continued)

(58) Field of Classification Search
CPC .......... B22F 10/28; B22F 10/34; B22F 10/73; B22F 12/224; B22F 12/50; B22F 12/52;
(Continued)

(56) References Cited

U.S. PATENT DOCUMENTS 10,675,814 B2  6/2020  Pourcher et al.
10,814,360 B2  10/2020 Pourcher et al.
(Continued)

FOREIGN PATENT DOCUMENTS

CN   103738747 A   4/2014
JP   4351218 B2    10/2009
(Continued)

OTHER PUBLICATIONS

International Search Report dated Jul. 1, 2020, in corresponding PCT/EP2020/064000 (5 pages).

*Primary Examiner* — Philip C Tucker
*Assistant Examiner* — Jimmy R Smith, Jr.
(74) *Attorney, Agent, or Firm* — VENABLE LLP

(57) ABSTRACT

A powder bed fusion additive manufacturing machine (10) comprises a working area (20) able to receive a superposition of different layers of powder, a device (30) for depositing a layer of powder onto the working area and a consolidation source (40) used to selectively consolidate each layer of powder deposited onto the working area, the device for depositing a layer of powder comprising a powder reservoir (32) able to be positioned above the working area, and a powder distribution opening being provided in the bottom part of the reservoir, the device for depositing a layer of powder comprising a vibrating device (68) able to subject the reservoir to vibrations, and the powder distribution opening of the reservoir being equipped with a sieve. The reservoir is mounted on a weighing sensor.

12 Claims, 5 Drawing Sheets

(51) Int. Cl.
    *B22F 12/50*     (2021.01)
    *B22F 12/52*     (2021.01)
    *B22F 12/53*     (2021.01)
    *B22F 12/55*     (2021.01)
    *B22F 12/57*     (2021.01)
    *B22F 12/60*     (2021.01)
    *B33Y 30/00*     (2015.01)
    *B33Y 40/00*     (2020.01)
    *B22F 10/73*     (2021.01)
    *B22F 12/00*     (2021.01)
    *B22F 12/63*     (2021.01)
    *B22F 12/90*     (2021.01)
    *B33Y 10/00*     (2015.01)

(52) U.S. Cl.
    CPC .............. *B22F 12/53* (2021.01); *B22F 12/55* (2021.01); *B22F 12/57* (2021.01); *B22F 12/60* (2021.01); *B33Y 30/00* (2014.12); *B33Y 40/00* (2014.12); *B22F 10/73* (2021.01); *B22F 12/224* (2021.01); *B22F 12/63* (2021.01); *B22F 12/90* (2021.01); *B22F 2999/00* (2013.01); *B33Y 10/00* (2014.12)

(58) Field of Classification Search
    CPC .......... B22F 12/53; B22F 12/55; B22F 12/57; B22F 12/60; B22F 12/63; B22F 12/90; B22F 2202/01; B22F 2999/00; B29C 64/153; B29C 64/205; B29C 64/329; B29C 64/343; B29C 64/321; B29C 64/336; B29C 64/209; B33Y 10/00; B33Y 30/00; B33Y 40/00; Y02P 10/25
    See application file for complete search history.

(56) References Cited

U.S. PATENT DOCUMENTS

| | | |
|---|---|---|
| 11,292,059 B2 | 4/2022 | Nicaise et al. |
| 11,345,083 B2 | 5/2022 | Carlavan et al. |
| 2017/0021452 A1 | 1/2017 | Tanaka et al. |
| 2018/0133956 A1* | 5/2018 | Buller .................... B33Y 50/02 |
| 2020/0269510 A1 | 8/2020 | Nicaise et al. |
| 2022/0001453 A1 | 1/2022 | Effernelli et al. |

FOREIGN PATENT DOCUMENTS

| | | |
|---|---|---|
| WO | 95/34468 A1 | 12/1995 |
| WO | 2017/108867 A1 | 6/2017 |
| WO | 2017/194107 A1 | 11/2017 |
| WO | 2019/094278 A1 | 5/2019 |

* cited by examiner

[Fig. 1]
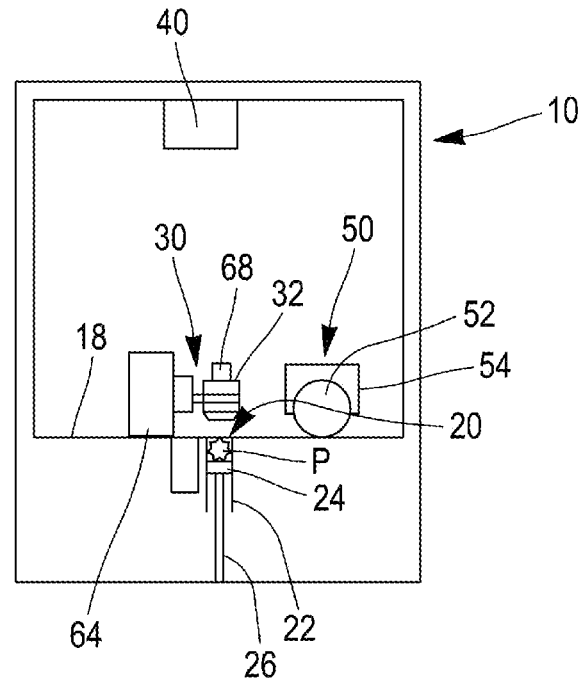
[Fig. 2]
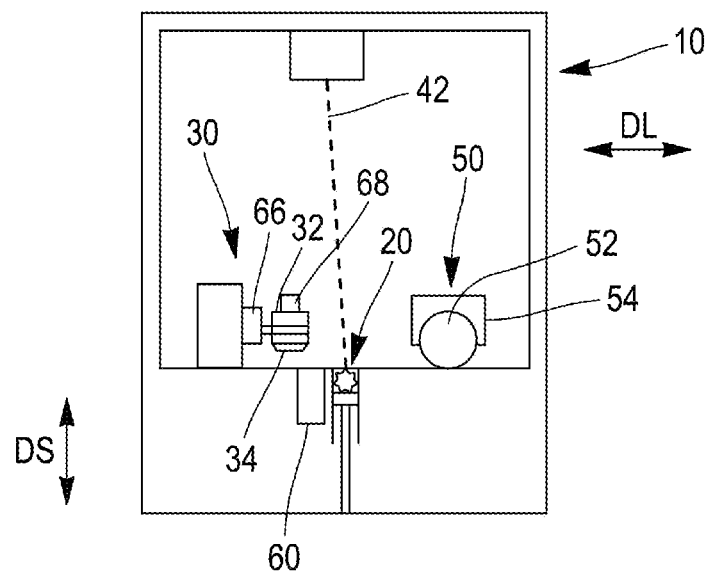

[Fig. 3]
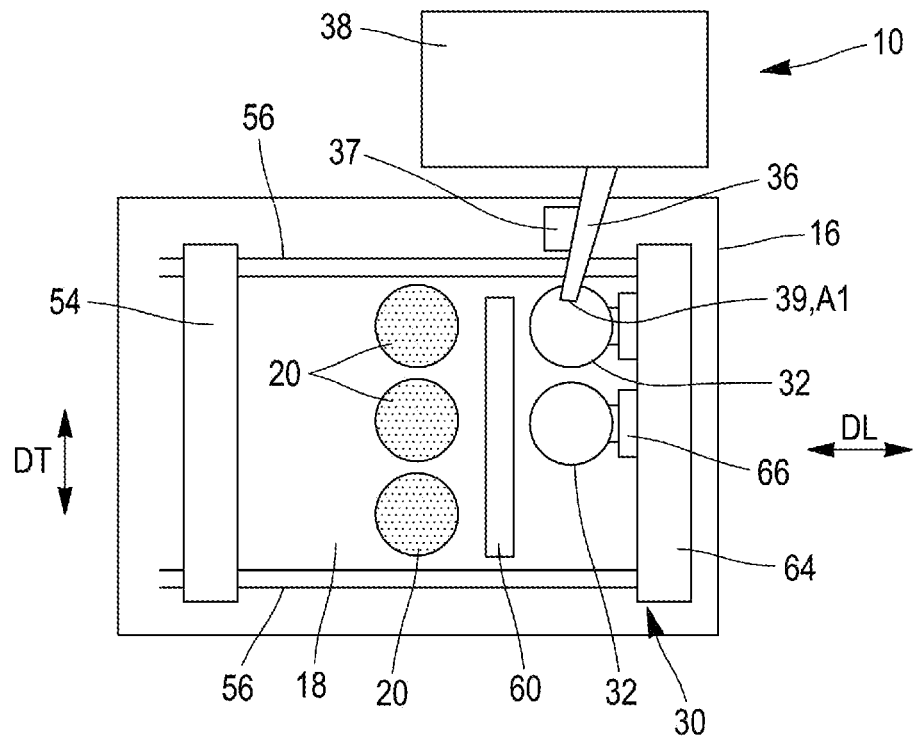
[Fig. 4]
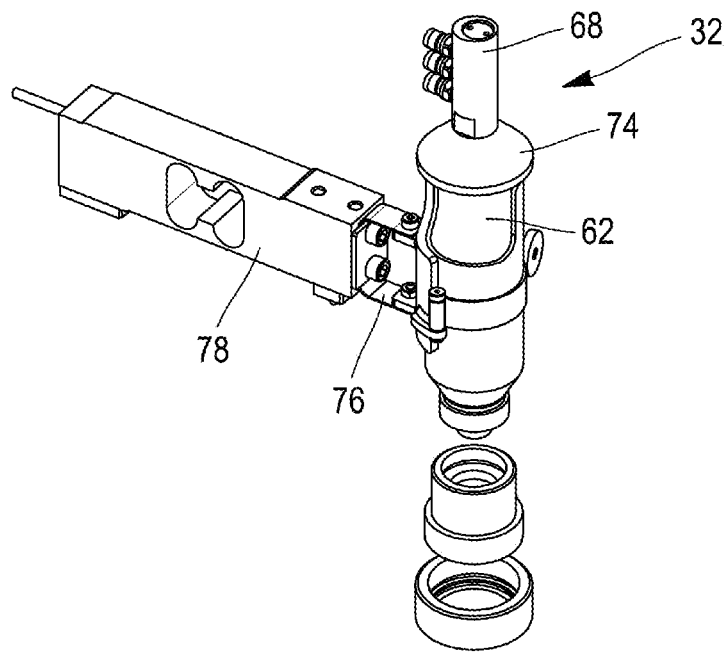

[Fig. 5]
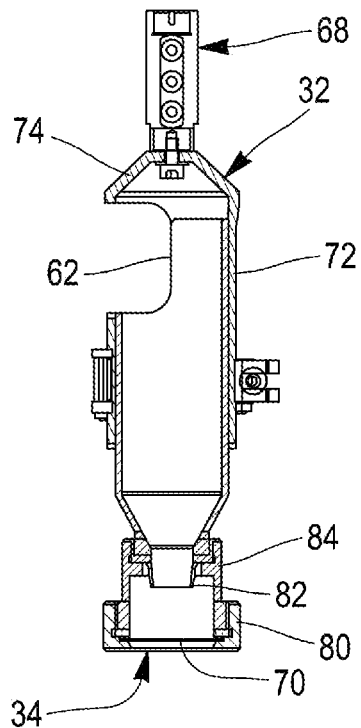
[Fig. 6]
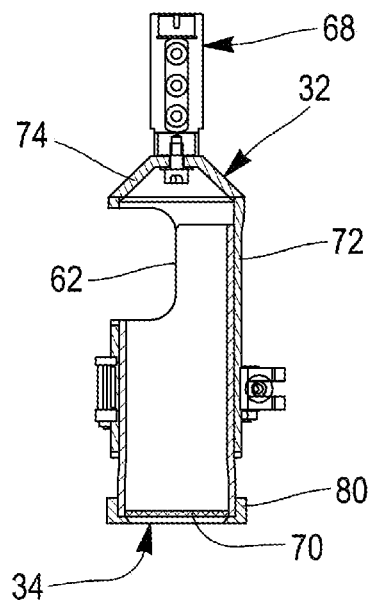

[Fig. 7]
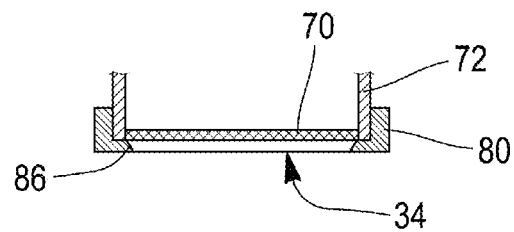
[Fig. 8]
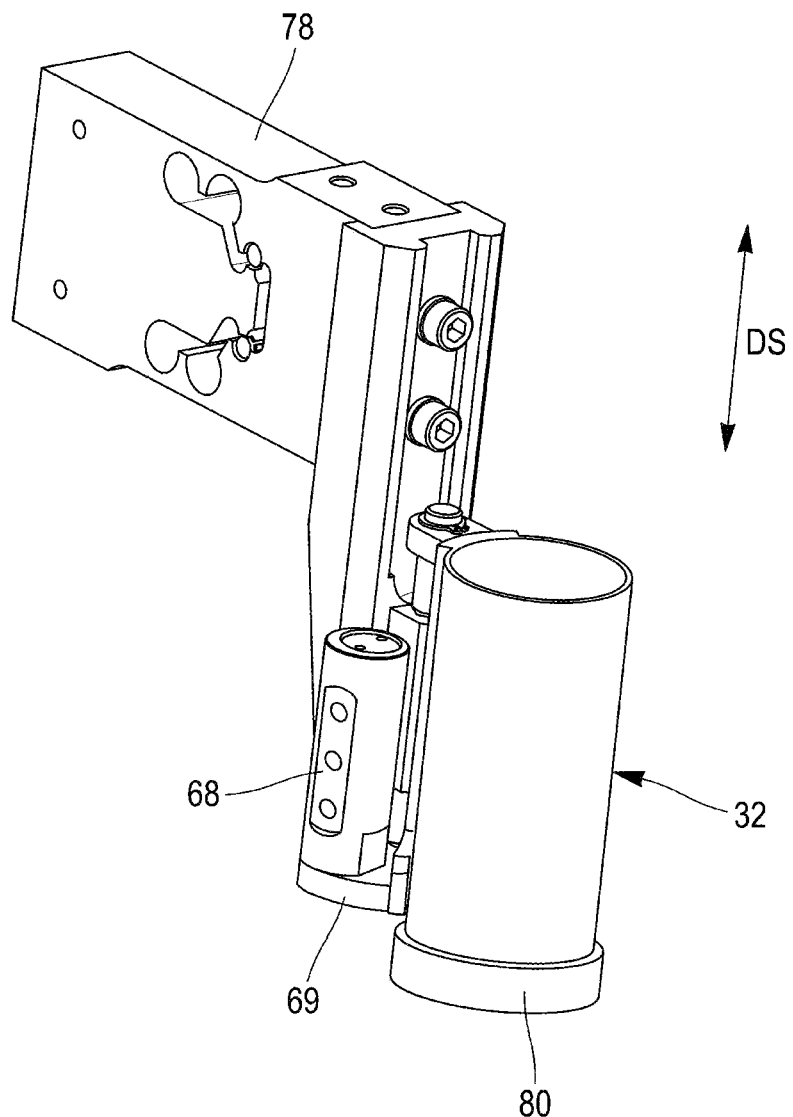

[Fig. 9]
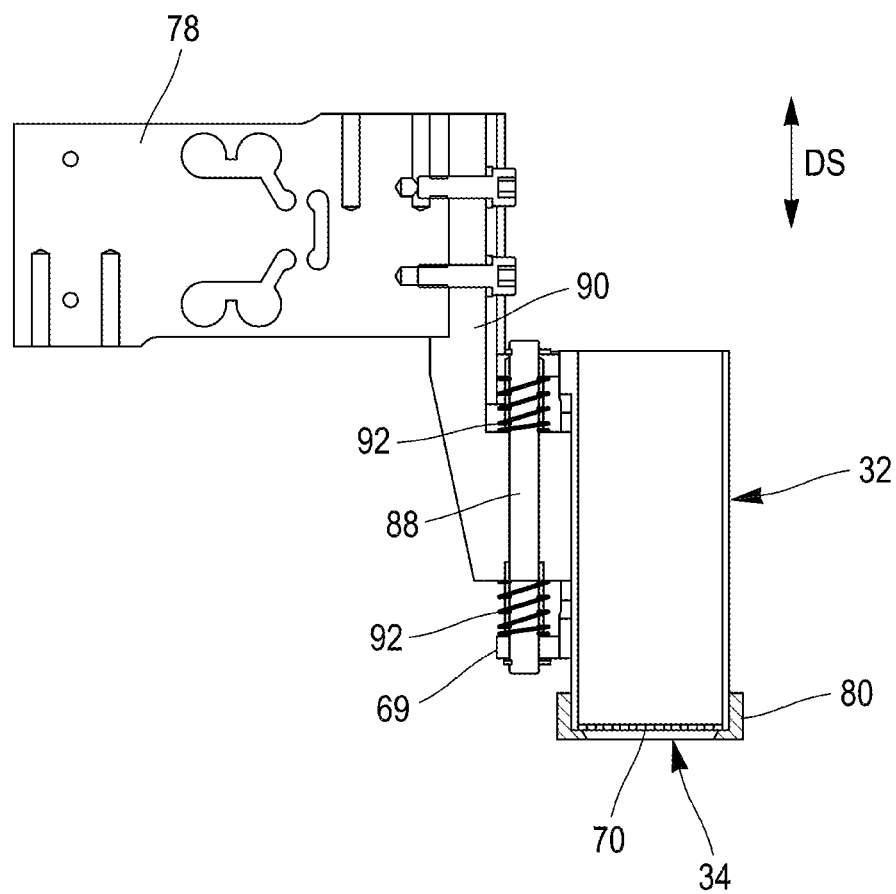

ADDITIVE MANUFACTURING MACHINE WITH POWDER DISPENSING BY SIEVING

BACKGROUND

The invention relates to an additive manufacturing machine using a powder-based additive manufacturing method.

More specifically, the invention falls into the domain of powder bed fusion additive manufacturing and seeks to optimize the deposition of very small quantities of powder, for example 0.5 grams, onto a working area of small surface-area—from 3 to 20 cm$^2$ as a rough idea of scale.

Application WO2017108867 describes a powder bed fusion additive manufacturing machine comprising a device able to deposit a variable profile line of powder in front of the device used to spread the powder over the working area.

More specifically, the machine described in application WO2017108867 comprises at least one injector for directly injecting powder over a working surface of the machine, this injector being movable with respect to the working surface along at least one transverse horizontal direction. In addition, this machine also comprises a system for regulating the amount of powder distributed by the injector.

According to this application WO2017108867, the amount of powder distributed by the injector can be regulated by regulating the height of the injector with respect to the working surface. For this reason, the injector is movable with respect to the working surface along a vertical direction, and the regulating system is able to regulate the vertical position of the injector with respect to the working surface.

The regulating system described in application WO2017108867 is unable to deposit a very small amount of powder, 0.5 grams for example, onto a working area of small surface-area—from 3 to 20 cm$^2$ for example.

Patent JP4351218 describes an additive manufacturing machine comprising a powder distribution device able to deposit a line of powder that is of variable profile or discontinuous across the width of a large working area and that can be adapted to distributing powders of different particle size and/or different fluidity.

For that purpose, the powder distribution device described in patent JP4351218 takes the form of a reservoir capable of translational movement along the length of the powder spreading device. Further, this mobile reservoir may be equipped with a vibrator and/or with a shut-off system preventing the distribution of powder.

Like the device described in application WO2017108867, the powder distribution device described in patent JP4351218 is unable to deposit a very small amount of powder, 0.5 grams for example, onto a working area of small surface-area—from 3 to 20 cm$^2$ for example.

Document CN103738747 describes a powder distribution device for an additive manufacturing machine. That powder distribution device takes the form of a mobile reservoir equipped with shut-off means and with two sensors for measuring upper and lower levels of powder in the reservoir.

The level sensors described in document CN103738747 provide information relating to a maximum or minimum amount of powder present inside the mobile reservoir. However, these sensors are unable to measure accurately and in real-time the exact amount of powder deposited in front of the powder spreading device. Therefore, these sensors do not allow a very small amount of powder, 0.5 grams for example, to be deposited onto a working area of small surface-area—from 3 to 20 cm$^2$ for example.

Document WO9534468 describes a powdered distribution device comprising a main reservoir connected to a powder feed hopper by a flexible pipe. The main reservoir is equipped with vibration means and comprises a powder distribution opening fitted with a screen. To complement this, the main reservoir may be equipped with a lid so that the powder distribution opening can be closed. The lid may also act as a buffer reservoir and be fitted with a sensor for measuring the amount of powder it contains, for example by measuring the weight of this powder.

One disadvantage is that document WO9534468 does not describe any means for managing the filling of the main reservoir from the feed hopper.

The key objectives of the present invention are to allow a very small amount of powder, 0.5 grams for example, to be deposited onto a working area of small surface-area—from 3 to 20 cm$^2$ for example, and to manage the filling of a reservoir used for powder distribution.

SUMMARY

To this end, the object of the invention is a powder bed fusion additive manufacturing machine, this additive manufacturing machine comprising a working area able to receive a superposition of different layers of powder, a device for depositing a layer of powder onto the working area and a consolidation source used to selectively consolidate each layer of powder deposited onto the working area, the device for depositing a layer of powder comprising a powder reservoir able to be positioned above the working area, and a powder distribution opening being provided in the bottom part of the reservoir.

According to the invention, the device for depositing a layer of powder comprises a vibrating device able to subject the reservoir to vibrations, and the powder distribution opening of the reservoir is equipped with a sieve.

Again according to the invention, the reservoir is mounted on a weighing sensor.

By combining a sieve with the use of vibrations it is possible to distribute a small amount of powder, 0.5 grams for example, onto a working area of small surface-area—from 3 to 20 cm$^2$ for example.

When no vibration is applied to the reservoir, the sieve is able to keep the grains of powder in the reservoir by encouraging the grains of powder to arch. In other words, in the absence of vibrations, the sieve encourages the formation of arches of powder grains inside the reservoir, thus preventing the grains of powder from flowing. When vibrations are applied to the reservoir, the arches collapse and the grains of powder pass through the sieve at a flow rate that is limited by the mesh size of the sieve, allowing a very small amount of powder, 0.5 grams for example, to be delivered with a precision of 0.02 g.

Because the reservoir is mounted on a weighing sensor it is possible to achieve optimum management of the filling of this reservoir from a powder supply.

The invention also makes provision for the following:
the mesh size of the sieve is comprised between 30 and 300 microns;
the surface area of the sieve is comprised between 3 and 20 cm$^2$;
the shape and surface area of the sieve are identical to the shape and surface area of the working area;
the sieve takes the form of a disc;
with the reservoir being mounted on a leaf spring, the vibrating device is mounted on the reservoir;

with a sieve being mounted on a reservoir via a ring having a shoulder to hold the sieve, the cross section of the sieve-holding shoulder decreases progressively in the direction away from the sieve;

the powder distribution opening of the reservoir is fitted with a shut-off element;

with the working area being fixed, the reservoir is mounted with the ability to move between a position in which it is situated above the working area and a position in which it is not situated above the working area;

the machine comprises a compaction device for compacting the layer of powder deposited by the depositing device on the working area;

the device for depositing a layer of powder comprises several reservoirs which are able to be positioned above a working area, each reservoir being equipped with a sieve and with a vibrating device.

The invention also covers a powder bed fusion additive manufacturing method performed with the machine according to the invention and the device thereof for depositing a layer of powder.

In the method according to the invention, a layer of powder is deposited on the working area by positioning the reservoir above the working area and then applying vibrations to the reservoir while the reservoir is situated above the working area, or by making several successive and juxtaposed deposits from various complementary positions adopted by the reservoir above a working area, vibrations being applied to the reservoir when it is situated over each one of these complementary positions, or by using the reservoir and its sieve to deposit powder in the form of a line next to the working area of the machine and in front of a powder spreading device.

BRIEF DESCRIPTION OF THE DRAWINGS

Further features and advantages of the invention will become apparent in the following description. This description, which is provided by way of a non-limiting example, refers to the appended drawings, in which:

FIG. 1 is a schematic face-on view of an additive manufacturing machine according to the invention, with a device for depositing a layer of powder which is in position above a working area of the machine;

FIG. 2 is a schematic face-on view of an additive manufacturing machine according to the invention, with a device for depositing a layer of powder which is not positioned above a working area of the machine;

FIG. 3 is a schematic view from above of an additive manufacturing machine according to the invention having several working areas and several reservoirs for depositing a layer of powder;

FIG. 4 is an exploded view of a first variant of a device for depositing a layer of powder of an additive manufacturing machine according to the invention;

FIG. 5 is a view in section of a first variant of a device for depositing a layer of powder of an additive manufacturing machine according to the invention;

FIG. 6 is a view in section of a second variant of a device for depositing a layer of powder of an additive manufacturing machine according to the invention; and FIG. 7 is a detailed view of the mounting of a sieve at the bottom part of a reservoir of a device for depositing a layer of powder of an additive manufacturing machine according to the invention;

FIG. 8 is a perspective view of a second variant of the mounting of a mobile reservoir on a weighing sensor in a device for depositing a layer of powder of an additive manufacturing machine according to the invention;

FIG. 9 is a view in section of a second variant of the mounting of a mobile reservoir on a weighing sensor in a device for depositing a layer of powder of an additive manufacturing machine according to the invention.

DETAILED DESCRIPTION

The invention relates to a powder bed fusion machine for additive manufacturing by powder bed deposition. Powder bed fusion additive manufacturing is an additive manufacturing method in which one or more parts are manufactured by the selective consolidation of various mutually superposed layers of additive manufacturing powder.

In a powder bed fusion additive manufacturing method, a first layer of powder is deposited on a support such as a platform, and then selectively consolidated according to a first horizontal section of the part or parts to be manufactured. Then, a second layer of powder is deposited onto the first layer of powder that has just been consolidated, and this second layer of powder is selectively consolidated, and so on, until the last layer of powder is reached that is useful for manufacturing the last horizontal section of the part or parts to be manufactured.

The consolidation is said to be selective because only zones of the powder layers that correspond to sections of the parts that are to be manufactured are consolidated. The consolidation is performed for example by total or partial fusion (sintering) of the grains of powder using one or more laser beams.

As illustrated in FIGS. 1 to 3, the additive manufacturing machine 10 according to the invention comprises one or more working areas 20 able to receive a superposition of different layers of powder, a device 30 for depositing a layer of powder on a working area, and a consolidation source 40 able to selectively consolidate each layer of powder deposited on a working area 20.

A working area 20 is provided for example in a work surface 18 of the machine. A working area 20 is situated for example in an enclosed manufacturing chamber 16 of the machine. The work surface 18 is, for example, horizontal. A working area 20 is, for example, defined by a build sleeve 22 and a build platform 24. For example, a build sleeve 22 extends vertically beneath the work surface 18 and opens into the work surface 18. The build platform 24 slides vertically inside the build sleeve 22 under the effect of an actuator 26 such as a ram. As illustrated in FIGS. 1 and 2, the work surface 18 and the sleeve 22 may be mounted fixed, and the build platform 24 is able to move in vertical translation in the sleeve 22 under the effect of the ram 26. In a variant (not illustrated) the build platform 24 is mounted fixed, and one or more rams are able to move the work surface 18 and the sleeve 22 in vertical translation relative to the platform.

The device 30 for depositing a layer of powder comprises one or more powder reservoirs 32 able to be positioned above a working area 20. A powder distribution opening 34 is provided in the bottom part of a reservoir 32.

The consolidation source 40 is, for example, a laser source emitting at least one laser beam 42, this laser beam 42 being able to selectively melt a layer of additive manufacturing powder that has been deposited on a working area 20. In a variant, several beams 42 may be emitted by several laser sources, such as laser diodes for example. Still in a variant, a beam 42 may be an electron beam emitted by an electron gun. One or more laser beams may also be combined with one or more beams of electrons in order to perform the selective consolidation of each layer of powder.

In order to allow selective consolidation of a layer of powder along paths corresponding to the section of the part or parts that are to be manufactured, a consolidation source 40 is associated with means for moving and controlling the beam or beams 42 and/or with means for moving this source. For example, optical lenses and mirrors are used to move the spot of a laser beam and modify its focus, electromagnetic coils and electrodes are used to move an electron beam and control its focus, and mechanical actuators are used to move one or more consolidation sources 40 above one or more working areas 20.

In order to compact each layer of powder deposited on a working area 20 by the deposition device 30, the additive manufacturing machine comprises a compaction device 50. This compaction device 50 adopts the form of a scraper or of a roller 52, for example mounted on a carriage 54. This carriage 54 is mounted with the ability to move in translation in a longitudinal direction DL above the work surface 19 and above at least one working area 20. The longitudinal direction DL is parallel to the work surface 18. The longitudinal direction DL is perpendicular to the direction of superposition DS of the layers of powder in the working area 20. The direction of superposition DS of the layers is the axis along which the layers are superposed on one another. This direction of superposition DS is perpendicular to the plane of each layer of powder. Because the plane of each layer of powder and the work surface 18 are, for example, horizontal planes, the axis of superposition AS is, for example, vertical. As illustrated in FIG. 3, the carriage 54 is, for example, mounted on rails 56 via rollers or glides. In order to be translationally driven in the longitudinal direction DL, the carriage 54 comprises, for example, an on-board drive system. Alternatively, the carriage 54 of the compaction device 50 may be moved by a motor mounted fixedly in the machine 10 and connected to the carriage via a movement transmission system such as a belt and pulleys.

Because it is possible for the powder to be deposited in excess on a working area 20, a powder collecting tray 60 may be provided in the work surface 18 to collect the excess powder deposited on the working area and pushed across by the compaction device 50 as it passes over a working area.

As FIG. 3 shows, the machine according to the invention may comprise several working areas 20 and/or the device 30 for depositing a layer of powder may comprise several reservoirs 32 which are able to be positioned above a working area, each reservoir being equipped with a sieve and with a vibrating device. By having several reservoirs, the deposition device allows the manufacture of one or more parts with different additive manufacturing powders, and therefore for example with different materials being combined into the one same part. By having several working areas and several reservoirs, the machine according to the invention for example allows parts to be manufactured with different additive manufacturing powders, and therefore different materials, simultaneously. With such a configuration, several collecting trays 60 may also be provided, so as to avoid mixing the excess powders collected.

As illustrated in FIG. 3, a build sleeve 22 may be cylindrical. In that case, the working area 20 is circular. However, a working area may also offer a working surface that is annular, polygonal, ellipsoidal, or any other shape suited to the geometry of the parts to be manufactured.

A reservoir 32 may contain enough powder for an entire additive manufacturing cycle. However, the deposition device 30 may also comprise at least one powder input 36 allowing powder to be delivered above the work surface 18 so as to supply a reservoir 32 with powder before or during an additive manufacturing cycle.

In instances in which the machine comprises several working areas and/or several reservoirs, several powder inputs 36 may be provided, delivering different additive manufacturing powders.

A powder input 36 takes the form of a chute or of a tube connected to a main powder reservoir 38. A powder input 36 is, for example, mounted fixedly above the work surface 18. In a variant, a powder input 36 may also be mounted with the ability to move above the work surface 18. The free end 39 of the powder input 36 forms a powder supply point A1 above the work surface 18. Advantageously, a powder input 36 is inclined with respect to a horizontal plane so that the powder flows under the effect of gravity in the powder input 36. To complement this, a powder input 36 may be equipped with a device 37 for controlling the flow rate of powder delivered by the supply point A1. This flow control device 37 may be a vibrating device and/or a device involving a valve.

In order to be able to fill a reservoir 32 with a powder input 36, a reservoir 32 comprises a filling opening 62. This filling opening is, for example, provided in the upper part of a reservoir 32, as shown by FIGS. 4 to 6. This filling opening 62 allows the free end 39 of a powder input 36 forming a powder supply point A1 to be introduced into a reservoir 32.

According to the invention, a reservoir 32 is able to be positioned over a working area 20.

In a first variant illustrated in FIGS. 1 to 3, a working area is fixed in the machine and a reservoir 32 is mounted with the ability to move between a position in which it is situated above a working area 20, which position is illustrated in FIG. 1, and a position in which it is not situated above this working area, which position is illustrated in FIGS. 2 and 3. For example, a powder reservoir 32 is mounted with the ability to move in translation in the longitudinal direction DL above a working area 20. To complement this, a reservoir 32 may also be mounted with the ability to move in a transverse direction DT parallel to the work surface 18 and perpendicular to the longitudinal direction DL. The transverse direction DT is perpendicular to the direction of superposition DS of the layers of powder in the working area 20.

In order to be capable of translational movement in the longitudinal direction DL above a working area 20, a reservoir 32 is, for example, mounted on a carriage 64 guided by the rails 56 and driven by an electric motor carried on board or sited at a distance outside the manufacturing chamber.

For the sake of its mobility in a transverse direction DT parallel to the work surface 18 and perpendicular to the longitudinal direction DL, a reservoir 32 is, for example, mounted on a traveller 66 guided and driven in its translational movement in the transverse direction DT on the carriage 64, for example via a rail and a belt driven by an electric motor. The mobility of a reservoir 32 in the transverse direction DT facilitates for example the supplying of the reservoir with powder from the free end 39 of a powder input 36, and also allows a layer of powder to be deposited on the working area as several successive and juxtaposed deposits from different complementary positions adopted by the reservoir above a working area.

In another variant which has not been illustrated, a reservoir 32 may be mounted fixedly in the machine. In that case, a working area 20 is mounted with the ability to move so that a reservoir 32 can be positioned over this working area 20.

According to the invention, the device 30 for depositing a layer of powder comprises a vibrating device 68 able to subject a reservoir 32 to vibrations, and the powder distribution opening 34 of a reservoir is equipped with a sieve 70, visible in FIGS. 4, 7 and 9.

The sieve 70 is produced in such a way as to hold the grains of powder in the reservoir 32 as long as no vibration is transmitted to the reservoir by the vibrating device 68. In order to achieve this, the sieve 70 is produced in such a way that, in the absence of vibrations coming from the vibrating device 68, the grains of powder form arches inside the reservoir 32.

The vibrating device 68 takes the form of a vibrator, for example a pneumatic vibrator. For example, a vibrating device is mounted on a reservoir 32. More specifically, because the powder distribution opening 34 is situated in the bottom part of a reservoir, the vibrating device 68 may be mounted on the upper part of a reservoir 32, as illustrated in FIGS. 4 to 6.

With a reservoir in the form of a hollow body 72, for example cylindrical and closed by an arched upper wall 74, the vibrating device is mounted on the upper wall of this hollow body 72.

As a variant, and as illustrated in FIG. 8, the vibrating device 68 may be juxtaposed with the reservoir 32 and for example fixed to a support 69 solidly attached to the reservoir 32.

For example, the vibrating device 68 transmits vibrations at between 50 Hz and 200 Hz to a reservoir 32, and more specifically to the body 72 of a reservoir, when this vibrating device 68 takes the form of a pneumatic vibrator.

To complement a pneumatic vibrator, the vibrating device 68 may also comprise a piezoelectric vibrator able to transmit vibrations at between 1 kHz and 35 kHz to a reservoir 32, and more specifically to the body 72 of a reservoir.

Because additive manufacturing powders, for example metal powders, have a particle size of between a few microns and 150 microns, the mesh size of a sieve 70 is comprised between 30 and 300 microns. The mesh size of the sieve is adapted according to the particle size and fluidity of the powder to be distributed, so as to encourage the grains of powder to form arches inside a reservoir when no vibration is applied to this reservoir.

Because the machine according to the invention is intended for example for the manufacture of small-sized parts in alloys of expensive materials such as palladium, platinum, gold or silver or alloys of tungsten, molybdenum or tantalum which are specific to certain applications (for example horology), a working area 20 is, for example, circular, with a diameter of between 2 and 5 centimetres, and a sieve is, for example, circular, with a surface area of between 3 and 20 cm$^2$.

To give an idea of scale, a reservoir 32 may contain between 15 and 200 cm$^3$ of additive manufacturing powder, namely approximately the maximum amount of powder that can be contained above the platform 24 in the build sleeve 22.

To simplify the depositing of a layer of powder on the working area and avoid depositing powder by spreading and in excess, the shape and the surface area of the sieve 70 of a reservoir 32 may be substantially identical to the shape and surface area of the working area 20 and therefore to the shape and surface area of the build platform 24. If the shape and surface area of the sieve 70 of a reservoir 32 are substantially identical to the shape and surface area of the working area 20, a layer of powder may be deposited on the working area simply by positioning the reservoir above the working area and then applying vibrations to the reservoir while this reservoir is situated above the working area.

In instances in which the surface area of a working area is greater than that of the sieve 70 of a reservoir 32, a layer of powder may be deposited on the working area by several successive and juxtaposed deposits, in the manner of a mosaic. These successive and juxtaposed deposits are made from different complementary positions adopted by the reservoir above a working area, vibrations being applied to the reservoir when it is situated in each of these complementary positions.

In addition to the deposit or deposits of powder made directly onto a working area by a reservoir 32, compaction of the deposited powder by a compaction device 50 may advantageously be provided.

Of course, a reservoir 32 with a sieve 70 may also be used to deposit powder, for example in the form of a line, next to a working area and in front of a powder spreading device such as a scraper.

In instances in which the body 72 of the reservoir 32 is cylindrical, the sieve 70 takes the form of a disc.

A sieve 70 takes, for example, the form of a screen cut to the desired shape from a metallic fabric woven from metal, for example stainless steel, wires.

In a variant, a sieve 70 may take the form of a three-dimensional trellis structure, of the lattice type, for example made using additive manufacturing. A three-dimensional trellis structure for the sieve makes it possible to use a larger mesh size in order to avoid risks of blockage, while at the same time making it possible to increase the area that slows the grains of powder, providing better retention of the grains of powder in the reservoir 32 as long as no vibration is transmitted to the reservoir by the vibrating device 68.

As illustrated in FIG. 4 and in a first variant, with the vibrating device 68 mounted on a reservoir 32, this reservoir is mounted on a leaf spring 76. This leaf spring 76 connects the reservoir 32 to its support, such as a carriage 64, a traveller 66 or a weighing sensor 78 visible in FIG. 4. A leaf spring 76 amplifies the amplitude of the vibrations of the reservoir when the vibrating device is active.

In a second variant illustrated in FIGS. 8 and 9, the vibrating device 68 and the reservoir 32 are mounted on a first support 69 mounted with the ability to slide with respect to a weighing sensor 78. As a preference, the first support 69 is mounted with the ability to slide with respect to the weighing sensor 78 in the direction of superposition DS of the layers of powder. Thus, the reservoir oscillates mainly in a direction perpendicular to the plane of the sieve 70, namely preferably in a vertical direction. For example, a spindle 88 is attached to the weighing sensor 78 using a second support 90, and the first support 69 is mounted with the ability to slide along this spindle 88. In order to control the oscillations of the reservoir 32 and return the reservoir to a stable rest position after the application of vibrations, springs 92 are interposed between the first support 69 and the second support 88. For example, the springs 92 are mounted on the spindle 88.

In order to know the exact amount of powder deposited by a reservoir 32, and as illustrated by FIGS. 4, 8 and 9, a reservoir 32 is mounted on a weighing sensor 78. A weighing sensor 78 is able to measure the mass of the reservoir and of the powder it contains. When powder is delivered by the reservoir 32, the weighing sensor 78 is able to measure the reduction in the mass of powder present in the reservoir, and therefore the amount of powder delivered. Advantageously, a weighing sensor 78 is able to detect a break in the flow of powder or an abnormal reduction in the amount of powder deposited, for example as a result of a plug of powder forming in the reservoir or of clumps of powder which may accumulate in a reservoir 32 as the manufacturing cycles progress. A weighing sensor 78 also allows control over the filling of a reservoir 32 via a powder input 36.

For example, the operation of the flow control device 37 of a powder input 36 is managed using the measurements taken by a weighing sensor 78. For this purpose, the machine comprises a control unit (not illustrated) connected to the weighing sensor 78 and to the flow control device 37.

A weighing sensor 78 is, for example, an extensometer gauge weighing sensor. A weighing sensor 78 for example takes the form of an arm mounted so that it can bend and fitted with an extensometer gauge.

By making it possible to know precisely the amount of powder deposited, the mounting of the reservoir 32 on a weighing sensor allows powder consumption to be optimized, this being something that is, for example, absolutely essential when the powder contains one or more precious metals.

In instances in which the device 30 for depositing a layer of powder comprises several reservoirs 32 containing different additive manufacturing powders, mounting each reservoir on a weighing sensor allows control over the ratio between the amounts of different powders deposited.

In instances in which a reservoir 32 is mounted on a carriage 64 via a traveller 66, the weighing sensor 78 connects the reservoir 32 to the traveller 66, it being possible for a leaf spring 76 to be interposed between the reservoir 32 and the weighing sensor 78.

For the purposes of mounting a sieve 70 on a reservoir 32, a mounting ring 80 is for example provided.

In a first variant illustrated in cross section in FIG. 5, with the distribution opening 34 of a reservoir 32 already being equipped with a nozzle 82, an extension 84 is mounted on the body 72 of the reservoir 32 and the sieve mounting ring 80 is mounted on this extension. More specifically, the extension 84 is mounted at the bottom part of the reservoir, below the nozzle 82 already present, and the sieve mounting ring 80 is mounted at the bottom part of the extension 84. In this first variant, the arches of powder that form above the sieve are situated in the extension 84. In instances in which the body 72 of a reservoir 32 is cylindrical, the extension 84 also adopts the form of a cylindrical body, and the mounting ring 80 is likewise cylindrical. For example, the extension 84 is screwed onto the body 72 of a reservoir 32. Thus, the reservoir 32 can be used with a sieve 70 or with a nozzle 82 by removing the sieve. For example, the mounting ring 80 is screwed onto the extension 84. Thus, the mounting ring 80 can easily be removed to change the sieve 70 and adapt the mesh size of the sieve to a new powder with a different particle size and/or a different fluidity.

In another variant illustrated in FIGS. 6 to 9, the distribution opening 34 of a reservoir 32 is not equipped with a nozzle 82 and the sieve mounting ring 80 is mounted directly on the body 72 of the reservoir 32. More specifically, the mounting ring 80 is mounted at the lower part of the reservoir. In this first second, the arches of powder that form above the sieve are situated in the body 72 of a reservoir 32. In instances in which the body 72 of a reservoir 32 is cylindrical, the mounting ring 80 is likewise cylindrical. For example, the mounting ring 80 is screwed onto the body 72.

Thus, the mounting ring 80 can easily be removed to change the sieve 70 and adapt the mesh size of the sieve to a new powder with a different particle size and/or a different fluidity.

In either one of the variants for the mounting of a sieve, and as shown in detail in FIG. 7, a ring 80 is a hollow body comprising a shoulder 86 in the bottom part. The open cross section of the shoulder is smaller than that of the sieve 70 in order to hold the sieve against the extension 84 or the body 72 of the reservoir when the ring is mounted on this extension 84 or this body 72.

In order to increase the amount of powder deposited around the exterior edge of the sieve, the cross section of the shoulder 86 holding the sieve decreases progressively in the direction away from the sieve.

In order to avoid any undesired distribution of powder, the powder distribution opening 34 of a reservoir 32 may be equipped with a shut-off element (not depicted) such as a valve, a flap, an orifice plate or a diaphragm for example. This shut-off element may be mounted below a sieve 70 or above the sieve and inside the reservoir.

The present invention also covers a powder bed fusion additive manufacturing method that can be implemented using the machine that has just been described. This method comprises a step of depositing a layer of powder on a working area 20 performed by subjecting a certain amount of powder to sieving and vibrations, for example using a reservoir 32 equipped with a sieve 70 and with a vibrating device 68, and a step of selective consolidation of the deposited layer of powder.

According to this method and in a first variant, a layer of powder is deposited on the working area by positioning the reservoir 32 above the working area 20 and then by applying vibrations to the reservoir while this reservoir is situated above the working area. In that case, the shape and surface area of the sieve are preferably identical to the shape and surface area of the working area.

In a second variant of the method according to the invention, a layer of powder is deposited on the working area by performing several successive and juxtaposed deposits from different complementary positions adopted by the reservoir 32 above a working area 20, vibrations being applied to the reservoir when it is situated in each of these complementary positions.

In a third variant of the method according to the invention, a layer of powder is deposited on the working area by using the reservoir 32 and its sieve 70 to deposit powder in the form of a line next to the working area of the machine and in front of a powder spreading device.

In instances in which a line of powder is deposited using the reservoir 32 and its sieve 70, mounting the reservoir on a weighing sensor allows the movement of the reservoir 32 and the operation of the vibrating device 68 to be slaved to the amount of powder deposited and allows the amount of powder deposited to be adapted, for example, to suit the shape of the working area, a partial deposit at the end of manufacture, or a fractionated deposit or, for example, to increase the amount of powder deposited at the ends of the line of powder.

Optionally, this powder bed fusion additive manufacturing method may also have provision for the layer of powder deposited by sieving and vibrations to be compacted before it is selectively consolidated, for example using a compaction device 50.

The invention claimed is:

1. A powder bed fusion additive manufacturing machine comprising:
   a working area configured to receive a superposition of different layers of powder;
   a device for depositing a layer of powder onto the working area; and
   a consolidation source configured to selectively consolidate each layer of powder deposited onto the working area,
   wherein the device for depositing the layer of powder comprises:
      a powder reservoir configured to be positioned above the working area;
      a powder distribution opening provided in a bottom part of the powder reservoir and equipped with a sieve;
      a vibrating device configured to subject the powder reservoir to vibrations, and
   wherein the powder reservoir is mounted on a weighing sensor, and
   wherein, with the sieve being mounted on the powder reservoir via a ring having a shoulder to hold the sieve, a cross-section of the sieve-holding shoulder decreases progressively in a direction away from the sieve.

2. The powder bed fusion additive manufacturing machine according to claim 1, wherein a mesh size of the sieve is between 30 and 300 microns.

3. The powder bed fusion additive manufacturing machine according to claim 1, wherein a surface area of the sieve is between 3 and 20 cm$^2$.

4. The powder bed fusion additive manufacturing machine according to claim 1, wherein a shape and surface area of the sieve are identical to a shape and surface area of the working area.

5. The powder bed fusion additive manufacturing machine according to claim 1, wherein the sieve takes a form of a disc.

6. The powder bed fusion additive manufacturing machine according to claim 1, wherein, with the powder reservoir mounted on a leaf spring, the vibrating device is mounted on the powder reservoir and the leaf spring connects the powder reservoir to the weighing sensor.

7. The powder bed fusion additive manufacturing machine according to claim 1, wherein the vibrating device and the powder reservoir are mounted on a first support mounted with an ability to slide with respect to the weighing sensor.

8. The powder bed fusion additive manufacturing machine according to claim 7, wherein, with a spindle being attached to the weighing sensor using a second support, the first support is mounted with the ability to slide along the spindle and springs are interposed between the first support and the second support.

9. The powder bed fusion additive manufacturing machine according to claim 1, wherein the powder distribution opening of the powder reservoir is fitted with a shut-off element.

10. The powder bed fusion additive manufacturing machine according to claim 1, wherein, with the working area being fixed, the powder reservoir is mounted with the ability to move between a position in which it is situated above the working area and a position in which it is not situated above the working area.

11. The powder bed fusion additive manufacturing machine according to claim 1, further comprising a compaction device for compacting the layer of powder deposited by the depositing device on the working area.

12. The powder bed fusion additive manufacturing machine according to claim 1, wherein the device for depositing the layer of powder comprises several powder reservoirs which are able to be positioned above the working area, and wherein each powder reservoir is equipped with a sieve and with a corresponding vibrating device.

* * * * *